UNITED STATES PATENT OFFICE.

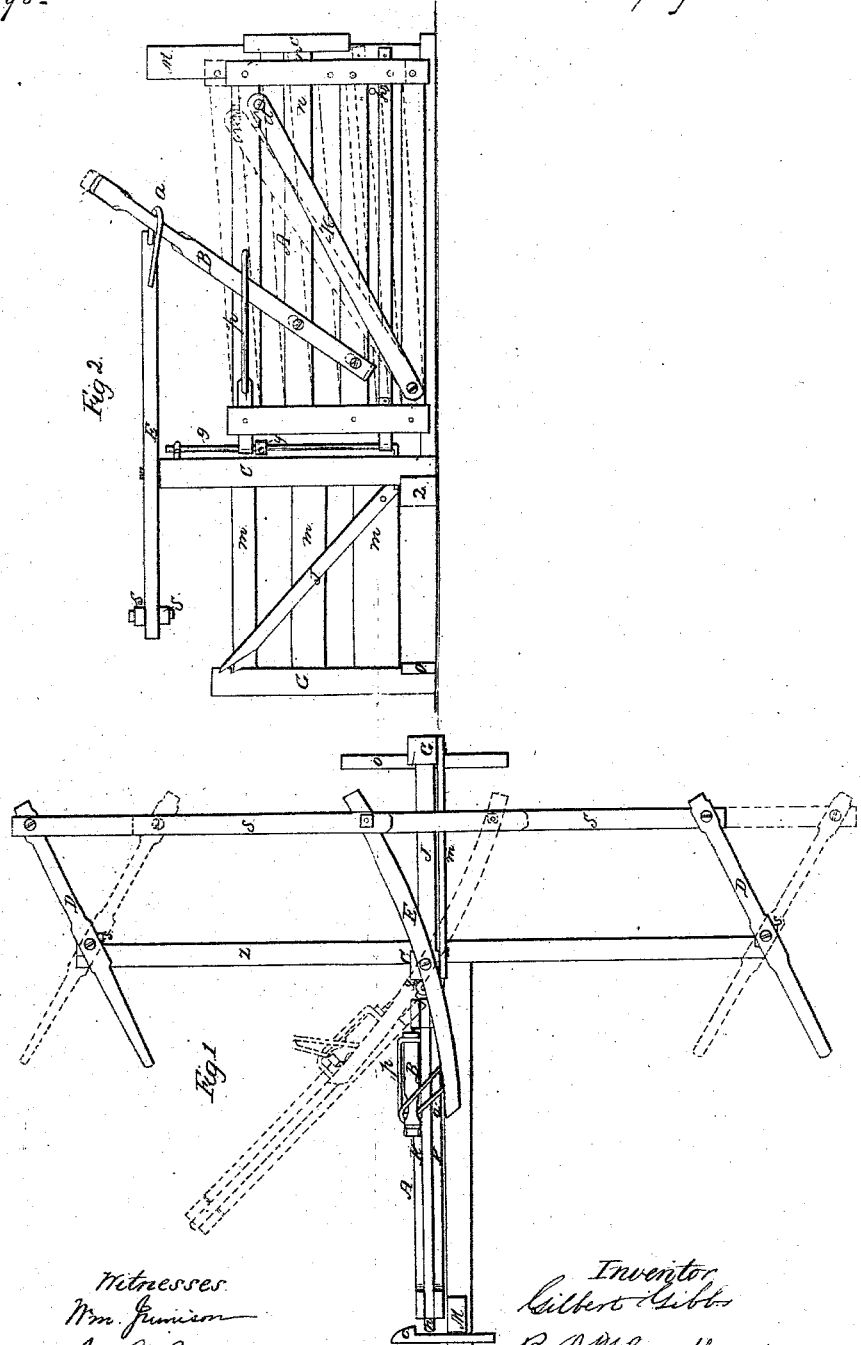

GILBERT GIBBS, OF FAIRVIEW, INDIANA.

Letters Patent No. 82,398, dated September 22, 1868.

---

IMPROVEMENT IN FARM-GATES.

---

*The Schedule referred to in these Letters Patent and making part of the same.*

---

TO ALL WHOM IT MAY CONCERN:

Be it known that I, GILBERT GIBBS, of Fairview, in the county of Switzerland, and State of Indiana, have invented new and useful Improvements in Farm-Gates; and I do hereby declare that the following is a full, clear, and exact description thereof, which will enable those skilled in the art to make and use the same, reference being had to the accompanying drawings, forming part of this specification.

This invention relates to that class of farm-gates, which are so arranged that a person on horseback or in a vehicle, may open and close them, without alighting for the purpose, as with ordinary gates; and this invention consists in the peculiar devices for accomplishing this object, and also in several devices for raising the gate to prevent its dragging on the ground, as ordinary gates will often do.

Figure 1 is a plan.
Figure 2 is an elevation.

Similar letters of reference indicate corresponding parts.

A is the gate, B the bolt-lever, and C the post to which the gate is hung. This post is framed to a sill, Z, at either end of which are the posts *s s*. On these posts are the levers D D, for opening and closing the gate, their rear ends being attached to the bars S S, for communicating their motion to the curved lever E, which is hung on the gate-post C, as shown. At the end of the lever E nearest the gate, is attached the link or bail *a*, said link projecting obliquely forward, and surrounding the neck of the lever B, as shown.

The lever B is attached to the bolt *n* in such a manner that a pressure against it from the front draws the bolt from the catch *c*. *p* is a guide for the lever B.

*Operation.*

The operation is shown in fig. 1, the red lines indicating the position of the gate, and the direction of the pressure required on the levers D D. It will be seen that the first pressure on the levers tends to draw back the bolt *n*, through medium of the oblique position of the link *a* and lever B, thus freeing the gate before opening it.

The devices for raising the gate are as follows:

On the hinge-rod *g* is a collar, *y*, with a set-screw. It will readily be seen that the collar may be slipped upward to a limited height, and the set-screw tightened; and, as the upper hinge rests on the said collar, the gate will remain raised as long as desired.

In the lower edge of the upper bar of the gate, near the front stile, are notches, into which fits the bolt *d*, which passes through the upper ends of the diagonals K K, the lower ends turning on a bolt in the lower bar. By raising the front stile of the gate, the bolt *d* may be made to engage with any desired notch, thus raising the gate, as shown in red lines, fig. 2.

The lower hinge of the gate is attached to a narrow bar, as shown, the front end of the said bar being perforated with holes.

By drawing the lower part of the gate forward, and inserting the pin *h* immediately behind the front stile, the gate may be raised at the forward end.

Attached to the post C, and in a line with the gate, is a panel of fence, the bars, *m m m*, of which are attached to the posts C and G, with single pins or bolts. J is a diagonal, attached to the lower bar at one end, and having the other bevelled to fit notches in the post G. O is a sill, to which the post G is attached. It will be understood that, by raising the post G, the bevel on the diagonal J may be made to engage with the lower notch, and thus keep the post G raised. Now, by forcing the post to the ground, and attaching it firmly thereto, the gate will be correspondingly raised at its forward end.

The post M may be set in the ground, in practice, or attached to a sill, as shown.

Having thus described my invention, what I claim as new, and desire to secure by Letters Patent, is—

1. The oblique link *a*, in connection with the central lever E, when so arranged as to draw the bolt *n* from the catch or socket *c* before opening the gate, substantially as shown and specified.

2. In combination with the bolt $n$, lever B, link $a$, and central lever E, the bars S S, and hand-levers D D, all arranged to operate substantially in the manner and for the purposes as set forth.

3. Attaching a panel composed of the post G, diagonal J, and bars $m\ m\ m$, and sill O, with a gate, when the panel is so arranged, that, by means of the notches in the post G, the forward part of the gate may be raised, as described and shown.

Witness my hand, this 7th day of July, 1868.

GILBERT $\overset{\text{his}}{\times}$ GIBBS.
mark.

Witnesses:
   HENRY CORNUTE, Jr.,
   J. TIFFTS.